BEST AVAILABLE COPY

3 Sheets—Sheet 1.

A. WARTH.

Machine for Cutting Textile and other Materials.

No. 9,232. Reissued June 1, 1880.

Witnesses.
Otto Nufland
William Muller

Inventor.
Albin Warth.
by Van Santvoord & Hauff
his attorneys

N. PETERS, PHOTO-LITHOGRAPHER, WASHINGTON, D. C.

A. WARTH.

Machine for Cutting Textile and other Materials.

No. 9,232. Reissued June 1, 1880.

Witnesses.
Otto Sufeland
William Miller

Inventor.
Albin Warth.
by Van Santvoord & Hauff.
his attorneys.

N. PETERS, PHOTO-LITHOGRAPHER, WASHINGTON, D. C.

164. CUTTI

3 Sheets—Sheet 3.

A. WARTH.

Machine for Cutting Textile and other Materials.

No. 9,232. Reissued June 1, 1880.

Witnesses.
Otto Hufeland
William Miller

Inventor.
Albin Warth.
by Van Santvoord & Hauff
his attorneys

N. PETERS, PHOTO-LITHOGRAPHER, WASHINGTON, D. C.

UNITED STATES PATENT OFFICE.

ALBIN WARTH, OF STAPLETON, NEW YORK.

MACHINE FOR CUTTING TEXTILE AND OTHER MATERIALS.

SPECIFICATION forming part of Reissued Letters Patent No. 9,232, dated June 1, 1880.

Original No. 106,101, dated August 2, 1870; Reissue No. 5,004, dated July 23, 1872; Reissue No. 5,186, dated December 10, 1872. Application for reissue filed February 25, 1880.

*To all whom it may concern:*

Be it known that I, ALBIN WARTH, of Stapleton, in the county of Richmond and State of New York, have invented a new and useful Improvement in Machines for Cutting Textile and other Materials, which improvement is fully set forth in the following specification, reference being had to the accompanying drawings, in which—

Figure 1:
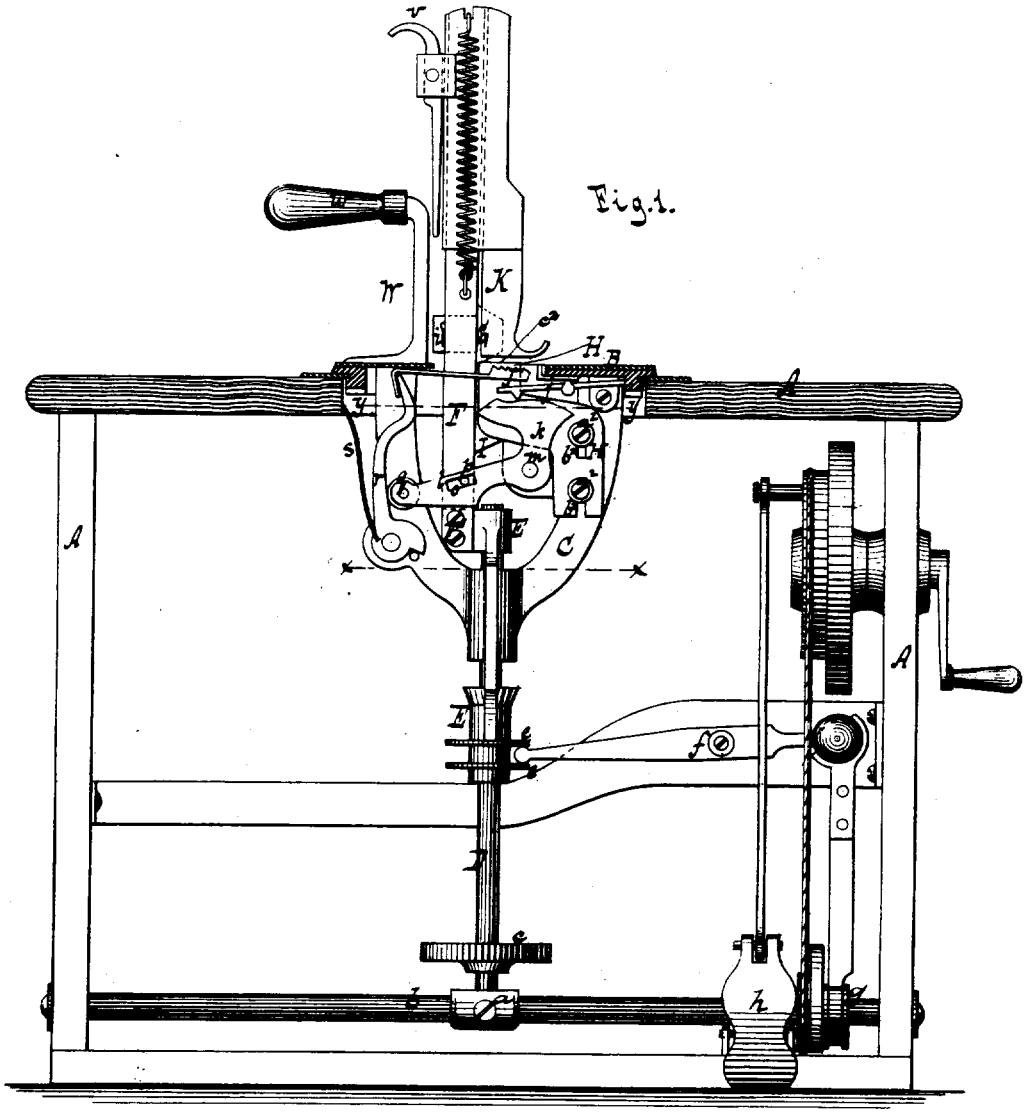
Figure 2:
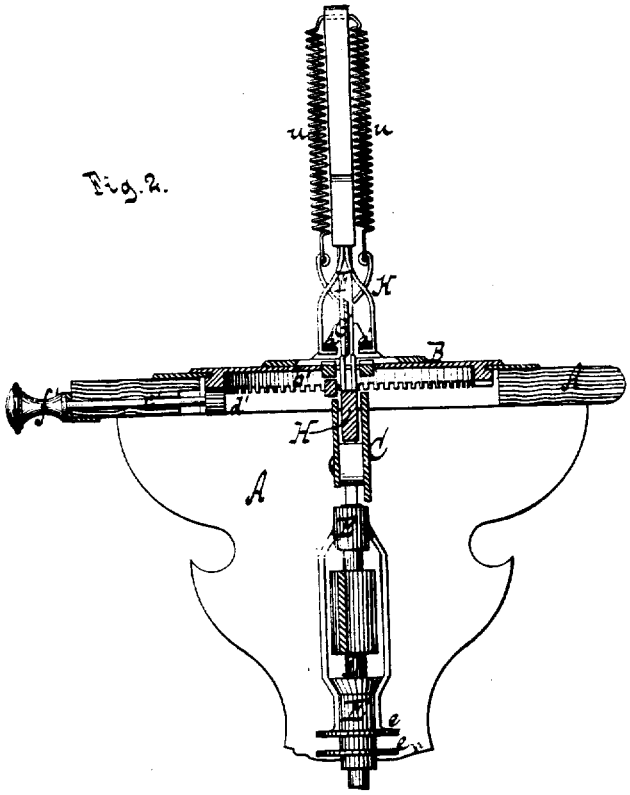
Figure 2:
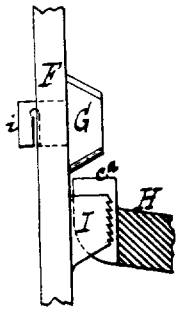
Figure 3:
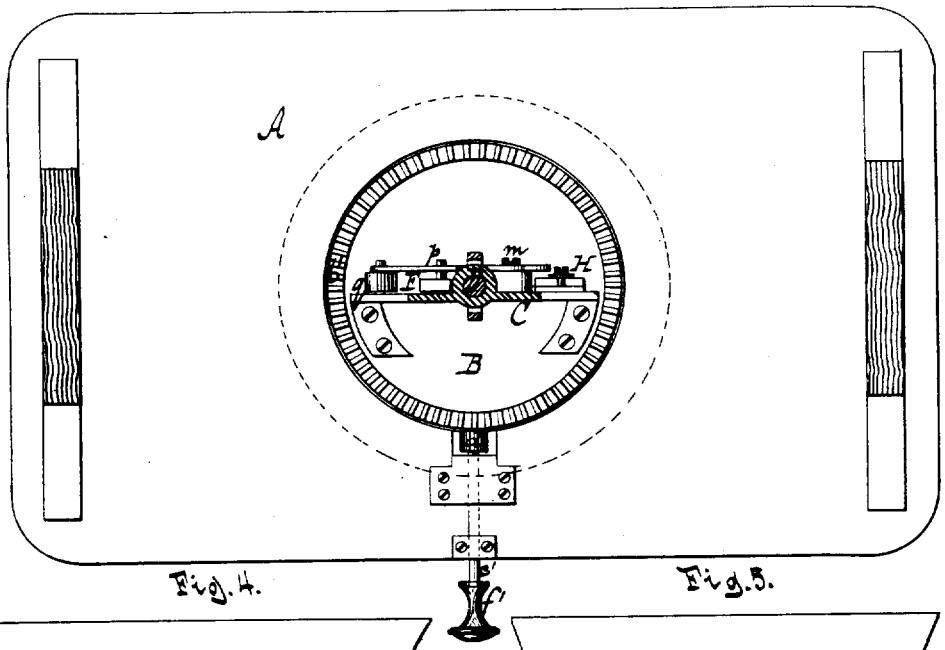
Figure 4:
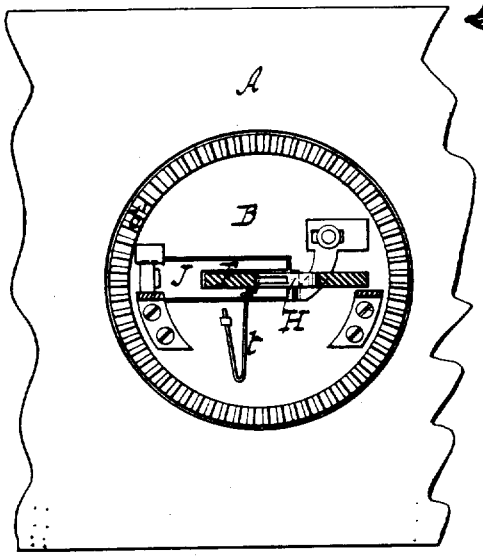
Figure 5:
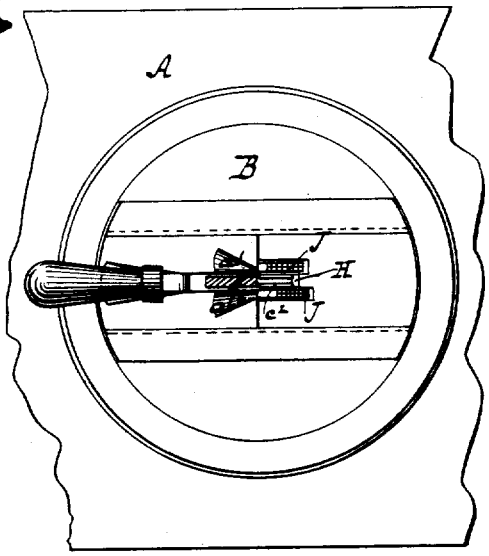
Figure 6:
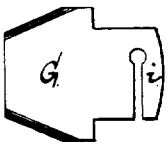
Figure 7:
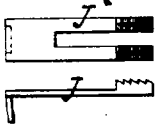

Figure 1 represents a sectional front view. Fig. 2 is a transverse section. Fig. 2* is a sectional side view of the cutter, the support for the material to be cut, and the cleaner. Fig. 3 is an inverted sectional plan of my machine, the line *x x* in Fig. 1 indicating the plane of section. Fig. 4 is a similar view, the plane of section being indicated by the line *y y*, Fig. 1. Fig. 5 is a sectional plan or top view of the same. Fig. 6 is a detached view of the cutter. Fig. 7 shows a detached plan and side elevation of the feed-dog.

Similar letters indicate corresponding parts.

This invention relates to a machine intended for cutting cloth, muslin, paper, leather, or other materials used in the manufacture of garments or shoes, said machine being principally constructed of a table, a platform or plate, which supports the material near the place where it is to be cut, and which is movable beneath said material, a cutting-instrument carried by said platform or plate, and is situated in a plane at right angles to the surface which supports said material, mechanism for imparting motion to the cutting-instrument, and a projection which rises from the platform or plate and follows the cutting-instrument through the cut in the material, and prevents the edges of the cut from crowding against said cutting-instrument.

In the platform or plate is a recess or opening for permitting the edge of the cutting-instrument to pass below the surface, which supports the material to be cut, and the part which supports the material to be cut can be raised or lowered, so as to bring it in the proper relation to the cutting-instrument. From the movable cloth-supporting platform or plate rises a support which carries a handle for turning said platform or plate, together with the cutting-instrument, and which support passes through the cut made in the cloth or other material by the action of the cutting-instrument.

The platform or plate which supports the material near the place where it is to be cut is firmly connected to a swivel-rod, on which is fitted a sleeve, to which the cutting-instrument is attached, and which is connected to the mechanism for imparting motion to the cutting-instrument, so that by turning the swivel-rod the supporting platform or plate and the cutting-instrument are turned without throwing the cutting-instrument out of gear with said driving mechanism. The cutting-instrument is connected to the sleeve by means of an arm extending from said sleeve.

With the platform or plate which supports the material near the place where it is to be cut, and with the cutting-instrument, is combined an automatic feed, which is carried by the platform or plate. With the platform or plate which supports the material near the place where it is to be cut, and with the cutting-instrument, is further combined a presser-foot, which slides on the cutter-bar.

The cutting-instrument is provided at its rear edge with a spring-catch for securing the same in the cutter-bar, and said cutting-instrument is provided with two cutting-edges, either of which can be brought to co-operate with one or the other of the cutting-edges formed by the edges of the slot or recess in the platform or plate which supports the material near the place where it is to be cut. A clearing-blade attached to the cutter-bar serves to keep the opening in the platform or plate free from impurities. The feed-dog receives its motion from the cutter-bar by a suitable lever-connection, as hereinafter more fully explained.

In the example represented by the drawings, the letter A designates a table, made of wood or other suitable material, and of any desirable form or size. On this table is placed a platform or plate, B, from the bottom surface of which extends a hanger, C, carrying a rod, D, that is stepped in a bearing, *a*, secured to a traverse, *b*, which is fastened between the legs of the table A. The rod D is firmly secured to the hanger C, and on its lower part is mounted a foot-piece, *c*, so that the operator can turn the hanger and the platform in either direction by the action of his foot, the platform B being fitted in the table A so that it can be readily swiveled round its own center. The rod D forms a guide for a sleeve, E, from the top part of which extends an arm, F′, carrying a flat bar, F, to which the cutting-instrument G is attached, while on the bottom part of said sleeve are secured two flanges, *e e*, which straddle the end of a lever, *f*, to which an oscillating motion is imparted by an eccentric, *g*, or by any other suitable driving mechanism.

The arm F′ extends from the sleeve in such a manner that the cutter-bar F, on being swiveled round, describes a circle round the rod D, and at the same time the cutting-instrument always remains in gear with the driving mechanism. As the lever *f* oscillates it imparts to the sleeve E and bar F a reciprocating rising-and-falling motion, and by the sleeve E and bar F the desired motion is transmitted to the cutting-instrument.

The eccentric *g* revolves on the rod *b*, motion being imparted to it by hand or foot or any other power. If foot-power is used, I employ a treadle, *h*, which is hung at or near the center of its length, so that motion can be imparted to it in one direction by depressing the toes of the foot and in the other direction by depressing the heel.

The cutting-instrument G is stamped out of sheet metal in the form shown in Fig. 6. It presents a double cutting-edge, and on its back is formed a spring-catch, *i*, so that when the shank of the cutting-instrument is pushed through the mortise in the bar F said spring will catch over the rear edge of the bar and retain the cutting-instrument or knife firmly in position. As the cutting-instrument descends it enters a recess or opening formed in the platform or plate B, so that the edge of said cutting-instrument can pass clear through the material to be cut. In this opening is fitted a socket, H, which is secured to the hanger C by set-screws $a^2$ $a^2$ passing through slots $b^2$ $b^2$, Fig. 1. The top $c^2$ of said socket, Fig. 2*, forms the support for the material near the place where it is to be cut, and it serves to hold said material toward the cutting-instrument, and by raising or lowering said socket the support for the material can be brought in the proper relation toward the cutting-instrument. This feature is of importance, since the cutting-instrument must be sharpened from time to time, and the relation of its cutting-edge toward the support of the material will thereby be subjected to changes, which would interfere with the successful operation of cutting if no provision were made for adjusting said support.

The inner top edges of the socket H co-operate with the cutting-edges of the cutting-instrument, either of said top edges being brought in operation for such purpose, according to the position of the cutting-instrument, which can be reversed so as to bring either of its cutting-edges into operation.

In the socket H works the clearer I, which is firmly secured to the bar F, and passes into the socket from below. (See Fig. 2*.) By the action of this clearer all fibers and small particles, which are liable to become disengaged from the material to be cut during the operation of cutting, are pushed out of the socket, and thereby the socket is prevented from becoming choked. The action of the clearer may be improved by making its edge serrated.

The material to be cut is fed to the knife by the action of a feed-dog, J, detached views of which are shown in Fig. 7. This feed-dog straddles the cutter-bar F, and its serrated front end is supported by a lever, *j*, Fig. 1, which is pivoted at one end to the hanger C, while its loose end bears upon the cam-shaped end *k* of a bell-crank lever, *l*. This bell-crank lever has its fulcrum on a pivot, *m*, secured in a bracket attached to the hanger C, and its lower arm is provided with a slot, *o*, which straddles a pin, *p*, secured in the bar F. In the end of this lower arm of the bell-crank lever is secured a friction-roller, *q*, that bears against the edge of the lever *r*, said lever being pressed up against the friction-roller by a spring, *s*. (See Fig. 1.)

The upper end of the lever *r* supports the hook-shaped tail end of the feed-dog J, and said lever is curved, so that when the friction-roller rises it imparts to the lever *r* an oscillating motion, and thereby the feed-dog is carried forward toward the cutting-instrument G; but before this forward motion of the feed-dog takes place the cam-shaped end of the bell-crank lever *l* causes the lever *j*, and with it the feed-dog J, to rise, so that the teeth of said feed-dog will take hold of the material to be cut, and be in position to carry said material along when the forward motion of the feed-dog takes place. A spring, *t*, (see Fig. 4,) which acts on the feed-dog, serves the double purpose of keeping the serrated end of the same down upon the lever *j* and of pressing the hook-shaped end of said feed-dog up against the lever *r*. When the bar F rises, therefore, the feed-dog is first caused to take hold of the material, and then it receives the forward motion, thereby carrying the material under the cutting-instrument, and when the bar F descends the feed-dog is caused to drop and then to recede, ready for a new move.

The bar F extends a certain distance beyond the mortise intended to receive the cutting-instrument, and the upper end of said bar forms the guide for the tubular shank of the presser-foot K. This presser-foot straddles the cutting-instrument, and it is depressed by the action of two springs, *u u*, one on each side, so as to produce a uniform action. These springs are hitched at their bottom ends to a wire passing through or fastened in the bar F, and their upper ends catch over the top edge of the tubular shank of the presser-foot. By the action of the presser-foot the material to be cut is kept down upon the platform or plate B during the time the cutting takes place, and at the moment when the feed motion takes place the presser-foot is raised sufficiently to allow the material to be fed without obstruction. The presser-foot can be raised by means of a handle, *v*, which is hinged to its shank, and which also acts as a stop to retain the presser-foot in its elevated position. For this purpose it is brought to bear upon the end of a handle, *w*, the support W of which rises from the platform or plate B just behind the cutter-bar, said handle serving to turn the cutting-instrument, together with the platform or plate which supports the material near the place where it is to be cut, in either direction, as the pattern to be cut may demand.

From the platform or plate B rise two projections, *a'*, one on each side of the cutter-bar F, and close to the same. These projections serve to prevent the cut material from crowding against the cutting-instrument or cutter-bar.

It will be readily seen that in order to have a handle above the material to be cut the support of said handle must extend up through the cut opened by the cutting-instrument in the material, and by placing the handle in this position in relation to the cutting-instrument the workman is enabled to guide the cutting-instrument with ease and facility to follow the lines of the pattern to be cut, and at the same time the great advantage is gained that by making the support of the handle itself of sufficient width, the material cut will be prevented from crowding against the cutting-instrument or the cutter-bar, as above stated, enabling the projections to be dispensed with.

It has been previously stated that the platform or plate B, together with the cutting-instrument, can be turned round by the action of the foot on the foot-piece *e*, secured to the swivel-rod D.

The same purpose can also be effected by a handle, *j'*, fastened to the outer end of a rod, *c'*, which extends through the table (see Figs. 2, 3, and 4) and carries a pinion, *d'*, that can be thrown in gear with a circular rack, *b'*, secured to the under surface of the platform or plate B. If the rod *c'* is drawn out, the pinion is thrown out of gear with the circular rack on the platform.

In practice I prefer to use the handle *w* for imparting motion to the platform B. In all cases, however, no matter which of the devices above stated is used, the bar which carries the cutting-instrument is moved by the direct action of the platform or plate and the recess or opening in said platform or plate preserves its proper relation to the cutting-instrument; and, furthermore, whenever the platform or plate is turned beneath the material to be cut one or the other of the projections *a'* on the platform or plate B crowds off the edges of the cut, so that the cutting-instrument can be readily made to follow the contours of any desired pattern.

The material to be cut is adjusted on the platform or plate B beneath the presser-foot, and by imparting to the cutting-instrument the required motion the operation of cutting is effected. If the cutting-instrument is to follow a curved path and the piece to be cut is small, the platform or plate may remain stationary and the material can be moved as required; but if the piece from which a certain pattern is to be cut out is large and cannot be conveniently turned, then I turn the platform or plate B, causing the cutting-instrument to follow the outline of the pattern previously marked on the material, and in turning the platform or plate the opening or recess in said platform and the cutting-instrument always preserve their relative positions toward each other without fail, as already stated. The material to be cut can be moved toward the cutting-instrument by the hand of the operator or by the feed mechanism.

It is also an essential feature of my machine that the support W of the handle *w* shall be connected to the platform or plate B in such a position that it passes through the cut opened by the cutting-instrument. If this support does not pass through this cut, the material cannot be freely moved under the cutting-instrument in every direction, and the machine can only be used for cutting out patterns from comparatively small pieces of cloth or other material, while my machine can be used with great advantage in large clothing-houses, where a number of long pieces of cloth or other material are placed one on the top of the other, and after the patterns have been drawn on the top layer, the whole pile is passed through my cutting-machine. In cutting through such a pile, which may contain twenty or more layers of cloth or other material, it is essential that the edges of the cut shall be prevented from crowding against the cutting-instrument, which purpose is accomplished by my invention, as already fully explained.

It must be remarked that for different kinds of work the form of the cutting-instrument may be changed. It may, for instance, be made to act as a punch or button-hole cutter, or as a cutter of any other description; but in all cases, whatever the form or construction of the cutting-instrument may be, the platform or plate B must be made to carry the cutting-instrument, so that these two parts will preserve their relative position toward each other in whatever direction the platform or plate may be turned.

What I claim as new, and desire to secure by Letters Patent, is—

1. The combination, in a machine for cutting textile and other materials, of a table for supporting the material to be cut, a cutting-instrument situated in a plane at right angles to the surface which supports said material, mechanism for transmitting motion to said cutting-instrument, and a platform or plate which is movable beneath the material to be cut, and which carries with it the cutting-instrument and the mechanism for transmitting motion to the same, substantially as described.

2. The combination, in a machine for cutting textile and other materials, of a table for supporting the material to be cut, a cutting-instrument situated in a plane at right angles to the surface which supports said material, mechanism for transmitting motion to said cutting-instrument, a platform or plate which is movable beneath the material to be cut, and which carries with it the cutting-instrument and the mechanism transmitting motion to the same, and a cloth-supporting knife-socket within said platform or plate, substantially as described.

3. The combination, in a machine for cutting textile and other materials, of a table for supporting the material to be cut, a cutting-instrument situated in a plane at right angles to the surface which supports said material, mechanism for transmitting motion to said cutting-instrument, a platform or plate which is movable beneath the material to be cut, and which carries with it the cutting-instrument and the mechanism for transmitting motion to the same, and a projection or projections rising from said platform or plate and passing through the cut in the material, substantially as described.

4. The combination, in a machine for cutting textile and other materials, of a platform or plate which serves to support the material near the place where it is to be cut and is adapted to be turned in either direction, a cutting-instrument carried by said platform or plate and situated in a plane at right angles to the surface supporting the material to be cut, mechanism for imparting motion to said cutting-instrument, and a handle for turning said platform or plate and cutting-instrument as required by the pattern, such handle being secured to a support which rises from the platform or plate and which passes through the cut made in the material, substantially as described.

5. In a machine for cutting textile and other materials, the combination, with a platform or plate which supports the material near the place where it is to be cut and which is movable beneath said material, of a cutting-instrument carried by said platform or plate and situated in a plane at right angles to the surface supporting the material to be cut, mechanism for imparting motion to the cutting-instrument, and a projection, *a'*, which rises from said platform or plate and follows the cutting-instrument through the cut in the material, substantially as and for the purpose described.

6. In a machine for cutting textile and other materials, the combination, with a platform or plate which supports the material near the place where it is to be cut and which is movable beneath said material, of a cutting-instrument carried by said platform or plate and situated in a plane at right angles to the surface supporting the material to be cut, mechanism for imparting motion to the cutting-instrument, a recess or opening in the platform or plate for permitting the edge of the cutting-instrument to pass below the surface which supports the material to be cut, and a projection which rises from said platform or plate and follows the cutting-instrument through the cut made in the material, substantially as and for the purpose described.

7. In a machine for cutting textile and other materials, the combination, with a platform or plate which supports the material near the place where it is to be cut and which is movable beneath said material, of a cutting-instrument which is carried by said platform or plate and situated in a plane at right angles to the surface supporting the material to be cut, mechanism for imparting motion to the cutting-instrument, a projection which follows the cutting-instrument through the cut made in the material, and means for vertically adjusting the parts which support the material to be cut, so as to bring the same in the proper relation to the cutting-instrument, substantially as described.

8. The combination, in a machine for cutting textile and other materials, of a platform or plate which supports the material near the place where it is to be cut and which is movable beneath said material, a cutting-instrument which is carried by said platform or plate and situated in a plane at right angles to the surface supporting the material to be cut, mechanism for imparting motion to the cutting-instrument, and a swivel-rod which carries a sleeve connected to the cutting-instrument, and which is firmly connected to the platform or plate, so that by turning either the swivel-rod or the sleeve the platform or plate and the cutting-instrument are turned simultaneously, substantially as described.

9. The combination, in a machine for cutting textile and other materials, of a platform or plate which supports the material near the place where it is to be cut and which is movable beneath said material, a swivel-rod firmly connected to said platform or plate, a flanged sleeve fitted on said swivel-rod, an arm extending from said sleeve, a cutting-instrument attached to said arm, and mechanism which engages with the flanged sleeve for imparting motion to the cutting-instrument, so that by turning the swivel-rod the platform or plate and the cutting-instrument are turned round simultaneously without throwing the driving mechanism out of gear with the cutting-instrument, substantially as described.

10. The combination, in a machine for cutting textile and other materials, of a platform or plate which supports the material near the place where it is to be cut and which is movable beneath said material, a swivel-rod firmly connected to said platform or plate, a cutting-instrument carried by said platform or plate, mechanism for imparting motion to said cutting-instrument, and a projection which rises from the platform or plate and follows the cutting-instrument through the cut made in the material, substantially as and for the purpose described.

11. The combination, in a machine for cutting textile and other materials, of a platform or plate which supports the material near the place where it is to be cut and which is movable beneath said material, a swivel-rod firmly connected to said platform or plate, a cutting-instrument carried by said platform or plate, mechanism for imparting motion to the cutting-instrument, and an opening or recess in the platform or plate for permitting the edge of the cutting-instrument to pass below the surface which supports the material to be cut, all constructed and operating substantially as described.

12. The combination, in a machine for cutting textile and other materials, of a platform or plate which supports the material near the place where it is to be cut and which is movable beneath said material, a swivel-rod firmly connected to said platform or plate, a cutting-instrument carried by said platform or plate, mechanism for imparting motion to the cutting-instrument, a projection which rises from the platform or plate and follows the cutting-instrument through the cut made in the material, and an opening or recess in the platform or plate for permitting the edge of the cutting-instrument to pass below the surface which supports the material to be cut, all constructed and operating substantially as described.

13. The combination, in a machine for cutting textile and other materials, of a platform or plate which supports the material near the place where it is to be cut and which is movable beneath said material, a swivel-rod which is firmly connected to said platform or plate, a sleeve fitted on said swivel-rod, an arm extending from said sleeve, a cutting-instrument attached to said arm, a projection which rises from the platform or plate and follows the cutting-instrument through the cut made in the material, and mechanism for imparting motion to the cutting-instrument, all constructed for operation substantially as described.

14. The combination, in a machine for cutting textile and other materials, of a platform or plate which supports the material near the place where it is to be cut and which is movable beneath said material, a swivel-rod which is firmly connected to said platform or plate, a sleeve fitted on said swivel-rod, an arm extending from said sleeve, a cutting-instrument attached to said arm, an opening or recess in the platform or plate for permitting the edge of the cutting-instrument to pass below the surface which supports the material to be cut, and mechanism for imparting motion to the cutting-instrument, all constructed for operation substantially as described.

15. The combination, in a machine for cutting textile and other materials, of a platform or plate which supports the material near the place where it is to be cut and which is movable beneath said material, a swivel-rod which is firmly connected to said platform or plate, a sleeve fitted on said swivel-rod, an arm extending from said sleeve, a cutting-instrument attached to said arm, an opening or recess in the platform or plate for permitting the edge of the cutting-instrument to pass below the surface which supports the material to be cut, a projection which rises from the platform or plate and follows the cutting-instrument through the cut made in the material, and mechanism for imparting motion to the cutting-instrument, all constructed for operation substantially as described.

16. The arrangement of the knife or cutting-blade on an arm which extends at right angles from the sleeve or rod, by means of which motion is imparted to the knife, the connection between said sleeve or rod and the driving mechanism being such that the knife-carrying arm can be swiveled round in either direction without being thrown out of gear with the driving mechanism, substantially as set forth.

17. The combination, in a machine for cutting textile and other materials, of a platform or plate which serves to support the material near the place where it is to be cut and which is movable beneath said material, a cutting-instrument, and an automatic feed mechanism, both carried by said platform or plate, substantially as and for the purpose described.

18. The combination, in a machine for cutting textile and other materials, of a platform or plate which serves to support the material near the place where it is to be cut and which is movable beneath said material, a cutting-instrument carried by said platform or plate, an opening or recess in said platform or plate for permitting the edge of the cutting-instrument to pass below the surface which supports the material to be cut, and an automatic feed apparatus carried by said platform or plate, substantially as and for the purpose described.

19. The combination, in a machine for cutting textile and other materials, of a platform or plate which serves to support the material near the place where it is to be cut and which is movable beneath said material, a cutting-instrument carried by said platform or plate, a projection rising from said platform or plate and passing through the cut made in the material, and an automatic feed apparatus carried by said platform or plate, substantially as and for the purpose described.

20. The combination, in a machine for cutting textile and other materials, of a platform or plate which serves to support the material near the place where it is to be cut and which is movable beneath said material, a cutting-instrument carried by said platform or plate, an opening or recess in the platform or plate for permitting the edge of the cutting-instrument to pass below the surface which supports the material to be cut, a projection rising from said platform or plate and passing through the cut made in the material, and an automatic feed apparatus carried by the platform or plate, substantially as and for the purpose described.

21. The combination, in a machine for cutting textile and other materials, of a platform or plate which supports the material near the place where it is to be cut and which is movable beneath said material, a cutting-instrument secured to a bar which is carried by said platform or plate, a presser-foot arranged to slide on said cutter-bar, and a tension-spring, one or more, acting on the presser-foot, substantially as and for the purpose described.

22. The reversible knife G, provided at its rear edge with a spring-catch, substantially as described.

23. The combination of a knife having two cutting-edges with an opening having cutting-edges, either of which is brought in operation according to the position of the knife, substantially as described.

24. The combination, with the knife, the knife-supporting bar, and socket H, of a clearing-blade attached to the knife-bar, substantially as and for the purpose described.

25. The bell-crank lever *l* and levers *j* and *r*, in combination with the knife-supporting bar and with the feed-dog, substantially as described.

In testimony that I claim the foregoing I have hereunto set my hand this 24th day of February, 1880.

ALBIN WARTH.

Witnesses:
W. HAUFF,
E. F. KASTENHUBER.